Patented Sept. 14, 1926.

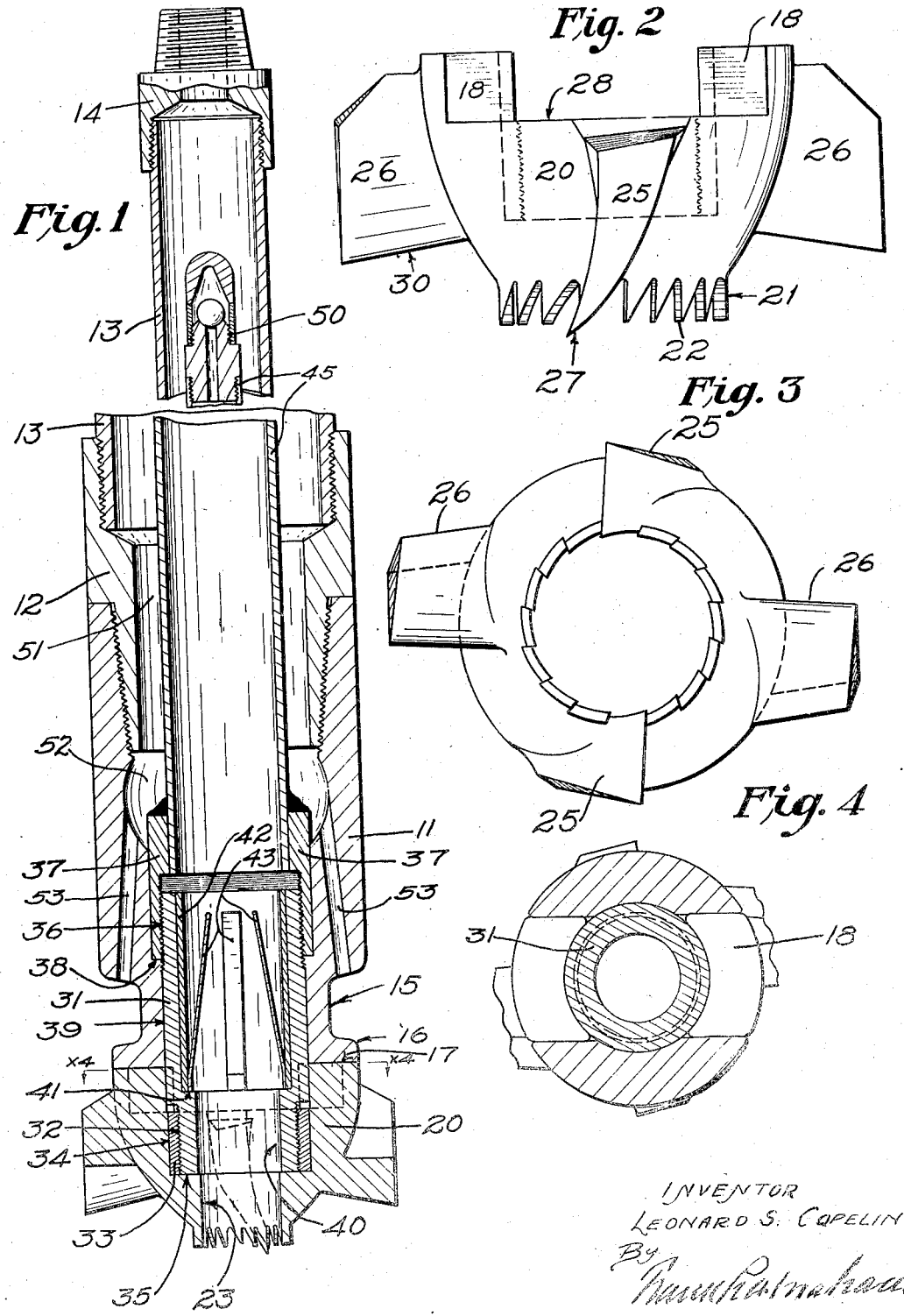

1,599,810

UNITED STATES PATENT OFFICE.

LEONARD S. COPELIN, OF COMPTON, CALIFORNIA.

CORE DRILL.

Application filed March 23, 1926. Serial No. 96,708.

My invention relates to the art of taking cores from oil wells, being more particularly a rotary core drill of the type in which an inner core-receiving tube is mounted within an outer barrel.

It is common practice with core drills of the character just referred to, to so construct the same as to provide replaceable cutting members which are ordinarily mounted in the drill head by means of a threaded connection, the power conducted to the cutting members or blade being through such threaded connection which results, in many instances, in a breaking of such connection.
A further objection to this form of mounting the cutting members is that the threaded connection becomes so tight that upon attempting to remove the cutting members, the parts are broken and it is necessary to renew such parts.

One of the principal objects of my invention is to provide a rotary core drill of the type referred to in which the weight of the pipe and tool is directed against the upper end of the cutter head, and the power transmitted through keys of large dimension, thereby eliminating any strain upon the threaded connection between the cutter head and the drill body, which threads perform the sole function of holding the cutter head in place, both in lowering the drill into the well and lifting the same from the well.

A further object of my invention is to so construct the drill body, cutter head and fluid passages in the drill body so that the circulating fluid is directed behind any solid material forming on the cutter head (ordinarily referred to as "balling up" of the cutters) thereby dislodging such material.
Another object of my invention is to make the associated parts of the core drill of simple form and construction so that the core drill may be readily assembled or taken down as may be necessary.
Other objects and advantages will appear hereinafter from the following specification.

Referring to the drawings which are for illustrative purposes only—

Fig. 1 is a vertical sectional view of a core drill showing an embodiment of my invention, such view being broken away, a portion above the broken line being made on a reduced scale for better illustrating the relation of parts.
Fig. 2 is a side elevation of the cutter head.

Fig. 3 is an inverted plan view of the cutter head shown in Fig. 2.

Fig. 4 is a sectional plan view on line $X^4$, Fig. 1.

The core drill comprises a hollow drill body 11, interiorly threaded at its upper end to receive a tool joint 12, into which is threaded at its upper end, a pipe or tube 13 forming the outer barrel, such outer barrel varying in length to suit requirements, the upper end of such barrel 13 being provided with a threaded connection 14, for attachment to the lower end of a drill pipe, not shown.

The lower end of the drill body 11 is reduced in diameter, as indicated at 15, forming an annular fluid-receiving space to be more particularly hereinafter referred to. Such reduced portion 15 terminates in a circular base or foot 16, provided on its under face with a transverse slot 17 extending thereacross, such slot 17 being for the purpose of receiving keys 18 formed on the upper end of a cutter head 20. The cutter head 20 is bowl shape in outline as clearly shown in Figs. 1 and 2, and terminates at its lower end in an annular toothed cutter 21, the teeth 22 of which, in the form shown, are preferably of the same radial thickness from the crown of the teeth to the base of the same, so that during the drilling operation the wearing away of such teeth will be substantially the same from the top to the bottom of the teeth. The cutter 21 is primarily a trimmer which trims the sides of the core as formed, so that the core may pass freely into the core-receiving opening 23 formed in the cutter head 20. The cutter head is also provided with two sets of outwardly extending blades 25 and 26, the blades 25 being preferably formed with their cutting edge 27 extending slightly below the cutting edge of the teeth 22, such blades 25 curving slightly rearwardly and upwardly and increasing in width to a point slightly below the top face 28 of the cutter head 20. The blades 26 are formed with their cutting edge 30 extending outwardly and slightly downwardly from the cutter head 20 at a point above the teeth 22 forming the cutter 21, such blades 26 increasing in thickness upwardly and terminating as an extension of the keys 18, on the cutter head 20.

It is also to be noted, as shown in Fig. 3, that the blades 25 do not extend outwardly from the cutter head to as great a distance as the blades 26, whereby the cutting edges of the blades 25 and 26 overlap in their circular cutting path so that the two blades 25 and 26 together cut or drill a hole of proper diameter.

The cutter head 20 is supported on the drill body 11 by means of a sleeve 31, the lower end of which is slightly reduced and threaded as indicated at 32, such threaded portion of the sleeve engaging a threaded ring 33, which is shrunk into a circular recessed portion 34 of the cutter head 20, such sleeve 31 and ring 33 resting upon a shoulder 35, formed by such circular recess just referred to. It is to be understood that the ring 33 may be dispensed with and threads cut in the head 20 to receive the threaded portion of the sleeve 31. The upper end of the sleeve 31 is threaded as indicated at 36, to receive the threads formed on a locking nut 37, such locking nut being seated upon a shoulder 38, formed at the upper end of the sleeve-receiving opening 39 of the drill body 11. The sleeve 31 is provided with a core-receiving opening 40, registering with the core-receiving opening 23 of the cutter head, such opening 40 being shouldered, as indicated at 41, to receive a core trap 42, such core trap consisting of a circular pipe section to which is attached, at their lower ends, a series of flat spring fingers 43, such springs being attached in any suitable manner, as by welding or riveting.

The parts just described are assembled in the following manner: the sleeve 31 is threaded into the cutter head 20, the sleeve being then slipped into the drill body so that the keys 18 on the cutter head enter into the slot 17 formed in the lower face of the drill body 11. The core trap 42 is then placed in the sleeve and the locking nut, to which the lower end of the core receiving tube 45 is welded or otherwise attached, threaded onto the upper end of the sleeve.

It will be understood from the description of the assembly of the parts that the locking nut 37 pulls the cutter head upwardly so that the upper face of the same and the upper face of the keys engage against the corresponding parts on the lower end of the drill body 11, and that the power transmitted to the cutters is through the keys and the corresponding parts of the drill body. The upper end of the core-receiving tube is supplied with a valve structure indicated at 50, for the purpose of permitting mud and fluid to be ejected from the top of the core-receiving tube as the core enters such tube.

Provision is made for the purpose of delivering a circulating fluid to the field of cutting operations, such circulating fluid being delivered from the drill pipe to the interior of the outer barrel 13, from which it passes down through the central opening 51 in the tool joint 12 to the interior of the drill body 11, a suitable circular chamber 52 being formed therein. This chamber 52 is provided with a series of outlet passages 53, which extend downwardly through the drill body and discharge into the annular space 15 formed about the reduced portion of the drill body heretofore referred to.

It is to be noted that in this particular the circulating fluid discharged through such openings impinges on the outer face of the upper end of the cutter head in such manner that in the event that the formation being drilled should "ball up" on the cutter head, that the same would be washed away by the eroding action of such circulating fluid.

I claim as my invention:

1. A rotary core drill comprising a drill body having a central opening and a transversely extending slot in its lower face, a cutter head secured to said body, keys on said cutter head extending into the slot in the body, an outer barrel secured to said body and an inner core receiving tube within said barrel.

2. A rotary core drill comprising a drill body having a central opening and a transversely extending slot in its lower face, a cutter head secured to said body, keys on said cutter head extending into the slot in the body, an outer barrel secured to said body and an inner core receiving tube within said barrel, said drill body having an annular reduced portion and having passages therein arranged to discharge a circulating fluid into said annular reduced portion.

3. A rotary core drill comprising a drill body having a central opening and a transversely extending slot in its lower face, a cutter head secured to said body, keys on said cutter head extending into the slot in the body and an inner core receiving tube within said barrel, said cutter head having a plurality of cutter blades extending outwardly therefrom and an annular toothed cutter formed thereon about a core receiving opening formed in said cutter head.

4. A rotary core drill comprising a drill body having a central opening and a transversely extending slot in its lower face, a cutter head secured to said body, keys on said cutter head extending into the slot in the body and an inner core receiving tube within said barrel, said cutter head having a plurality of cutter blades extending outwardly therefrom and an annular toothed cutter formed thereon about a core receiving opening formed in said cutter head, the teeth forming said annular cutter being of the same thickness throughout their length.

5. A rotary core drill comprising a drill body having a central opening and a transversely extending slot in its lower face, a cutter head secured to said body, keys on said cutter head extending into the slot in the body, an outer barrel secured to said body and an inner core receiving tube within said barrel, said cutter head having a plurality of blades formed thereon of different lateral extension and having cutting edges disposed in different planes and an annular toothed cutter formed on said head about a central core receiving opening.

6. A rotary core drill comprising a drill body having a central opening and a transversely extending slot in its lower face, a cutter head secured to said body, keys on said cutter head extending into the slot in the body, an outer barrel secured to said body and an inner core receiving tube within said barrel, said cutter head having a plurality of blades formed thereon with their cutting edges in different planes, and an annular toothed cutter formed on said head about a central core receiving opening.

7. A rotary core drill comprising a drill body having a central opening and a transversely extending slot in its lower face, a cutter head secured to said body, keys on said cutter head extending into the slot in the body, an outer barrel secured to said body and an inner core receiving tube within said barrel, said cutter head having a plurality of blades formed thereon of different lateral extension, and with their cutting edges in different planes, and an annular toothed cutter formed on said head about a central core receiving opening.

8. A rotary core drill comprising a drill body having a central opening extending longitudinally therethrough and a transversely extending slot in its lower end, a cutter head, keys on said head fitting into said slot in the drill body, a sleeve in said drill body threaded into said cutter head, means for securing said sleeve in said drill body, an inner core receiving tube mounted in said drill body and an outer barrel mounted on said drill body.

9. A rotary core drill comprising a drill body having a central opening extending longitudinally therethrough and a transversely extending slot in its lower end, a cutter head, keys on said head fitting into said slot in the drill body, a sleeve in said drill body threaded into said cutter head, a locking nut in said drill body threaded to said sleeve, a core receiving tube extending into said sleeve, means for attaching said tube to said sleeve, and an outer barrel on said drill body spaced apart from said tube.

10. A rotary core drill comprising a drill body having a central opening extending longitudinally therethrough and a transversely extending slot in its lower end, a cutter head, keys on said head fitting into said slot in the drill body, a sleeve in said drill body threaded into said cutter head, means for securing said sleeve in said drill body, a core trap mounted in said sleeve, an inner core receiving tube mounted in said drill body and an outer barrel mounted on said drill body.

11. A rotary core drill comprising a drill body having a shouldered central opening extending longitudinally therethrough and a transversely extending slot in its lower end, a cutter head having a central core receiving opening, keys on said cutter head fitting into said slot in the drill body, a sleeve in said drill body having its lower end threaded into said cutter head, a locking nut threaded onto the upper end of said sleeve seated on the shouldered portion of the central opening of said drill body, a core receiving tube fixed to said locking nut, and an outer barrel mounted on said drill body spaced apart from said core receiving tube.

12. A rotary core drill comprising a drill body having a shouldered central opening extending longitudinally therethrough and a transversely extending slot in its lower end, a cutter head having a central core receiving opening, keys on said cutter head fitting into said slot in the drill body, a sleeve in said drill body having its lower end threaded into said cutter head, a locking nut threaded onto the upper end of said sleeve seated on the shouldered portion of the central opening of said drill body, a core receiving tube fixed to said locking nut, and an outer barrel mounted on said drill body spaced apart from said core receiving tube, said cutter head having an annular toothed cutter formed about the core receiving opening therein and a plurality of cutting blades formed on said cutter head extending laterally therefrom.

In testimony whereof, I have hereunto set my hand at Los Angeles, California, this 12th day of March, 1926.

LEONARD S. COPELIN.